E. C. HOLTON.
HANDLE FOR VALVES AND OTHER USES.
APPLICATION FILED MAY 15, 1915. RENEWED FEB. 15, 1919.
1,354,106.
Patented Sept. 28, 1920.
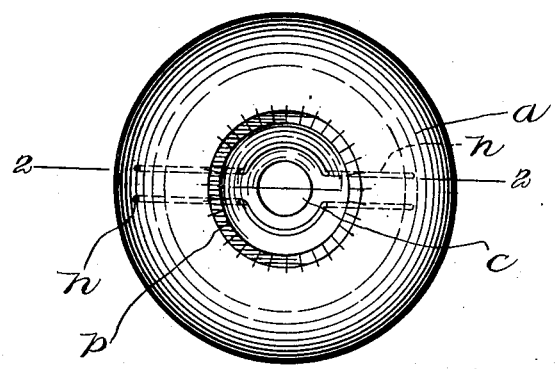
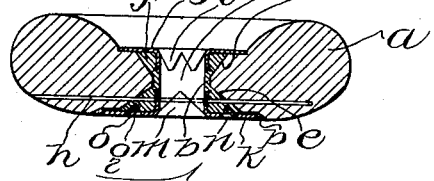
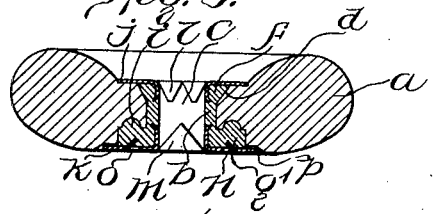
  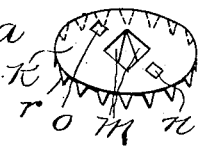
Inventor:
Edwin C. Holton

UNITED STATES PATENT OFFICE.

EDWIN C. HOLTON, OF SOMERVILLE, MASSACHUSETTS, ASSIGNOR TO HOLTON-ABBOTT MANUFACTURING COMPANY, OF WEST SOMERVILLE, MASSACHUSETTS, A CORPORATION OF MASSACHUSETTS.

HANDLE FOR VALVES AND OTHER USES.

1,354,106. Specification of Letters Patent. Patented Sept. 28, 1920.

Application filed May 15, 1915, Serial No. 28,325. Renewed February 15, 1919. Serial No. 277,281.

*To all whom it may concern:*

Be it known that I, EDWIN C. HOLTON, of Somerville, in the county of Middlesex and State of Massachusetts, have invented certain new and useful Improvements in Handles for Valves and other Uses, of which the following is a specification.

The present invention relates to handles particularly adapted to be applied to valves having squared shanks, but adapted as well to any other use in which a shank is adapted to receive a handle or hand wheel and to be rotated by the turning of the hand wheel. More particularly the invention relates to hand wheels, handles, knobs, etc., consisting of a body made ordinarily of wood and having a metal insert in which is the socket or hole for receiving the valve stem or other shank or rod to which the handle is applied, such metal insert being cast in a recess or aperture of the body.

The object of the present invention is to provide a means for preventing rotation of either of the elements constituted by the body and the insert relatively to the other. Where the external surface of the insert or core is a surface of revolution without projections of any kind, there is a possibility of the core becoming loose enough within the body to permit of the latter being turned without applying enough torque to the core to turn the stem or shank on which the handle is mounted. It is my purpose by the present invention to provide a simple and efficient means for making such a connection between the body and the core as will effectually prevent one of these members being rotated relatively to the other.

In the accompanying drawings wherein I have illustrated certain embodiments of the invention, Figure 1 is an under plan view of a valve handle body without the metal insert or core. Fig. 2 is a cross section of the stem on line 2—2 of Fig. 1 showing the core in place. Fig. 3 is a similar view showing a modification. Fig. 4 is a similar view showing a further modification.

Fig. 5 is a perspective view of the plate which covers one end of the metal core in the handle.

Fig. 6 is a similar view of a modified form of such plate.

The same reference characters indicate the same parts in all the figures.

Referring to the drawing *a* represents the body of the handle which in the form here illustrated is a wooden disk turned in the form common to handles used largely for radiator valves in heating systems, and also for many other purposes, *b* represents a metal core or insert which is provided to receive the valve stem and is formed with an aperture, recess, or socket *c* which is non-circular in whole or in part to conform to the corresponding shape of the valve stem. This core is formed of metal having a low melting temperature and is cast directly in place in an aperture or recess formed in the handle body for its reception.

In the form of handle shown here the recess provided to contain the core is a passage extending entirely through the handle and located at the center thereof, although with other forms of handle the recess might be otherwise formed and located. Both ends of the aperture are enlarged, the walls thereof adjacent to the ends being beveled so as to flare outwardly as shown at *d* and *e* in Fig. 2. The core which is cast in this aperture is thereby molded externally by the walls of the aperture and therefore has at its ends flanges *f* and *g* which occupy the enlargements of the aperture and which embrace between them that portion of the body which forms the narrowest part of the aperture, and may be called the "web" of the body. These flanges therefore bind the core in place and prevent it from falling out of the body. Although the contraction of the core in cooling causes such flanges to press against the opposite sides of the web, with friction, such friction may not be enough to prevent the body from rotating about the core, particularly when a strong resistance opposes rotation of the valve or other shank to which the handle is applied, wherefore I have designed, and desire to protect by this application a positive means for preventing any such turning regardless of whether the core is tight or loose in the body.

For this purpose I have provided one or more, and have here shown two, rods or wires *h* which are inserted in holes formed in the body transversely to the axis thereof and intersecting the central aperture, preferably in such a location as to cross one of the enlargements thereof. The metal of which the core is formed in being poured into the aperture surrounds and embeds those portions of the rod or rods which cross the aperture. Preferably those portions of the rods which lie in the aperture of the handle are offset out of a straight line, and where two rods are employed the offset portions are displaced oppositely to one another. The rods are thus gripped by the core and their ends extend into the body, whereby they anchor and lock the core in such a way that it cannot be turned in the body, and they are thus anchored in the core by means of their laterally offset portions in such a way that they can not be withdrawn or accidentally slipped out endwise from the handle. Thereby rods made of a material to which the molten metal of the core will not bond or adhere may be used, and such rods will be as effectively anchored in the core as may be necessary for the purpose.

An auxiliary means for accomplishing the same end consists of lugs $i$ or projections which are formed upon one of the flanges of the core and project into shallow holes or recesses in the body which open from one of the enlarged ends of the aperture at a greater distance from the axis of the aperture than the wall at the narrowest part of the aperture, as shown in Figs. 3 and 4. That is, as here shown the lugs $i$ project from the flange $g'$ of the core at points outside of the outer circumference of the core center to a limited distance into the body of the handle and are retained therein by the flange $f$ at the opposite end of the core. The contraction of the core in cooling forces these lugs endwise into the sockets wherein they are contained and brings the flanges of the core at the bases of the lugs into close contact with the handle body, thus making the core and body relatively immovable whereby there is no possibility for the handle to wabble or for the sockets containing the lugs to become worn and for the core to become loose. Either one or more rods may be used alone, as shown in Figs. 1 and 2, or the lugs may be used alone, as shown in Fig. 3, or the rods and lugs may be used in conjunction, as shown in Fig. 4. In each case the core is efficiently prevented from turning inside of the body, and in the case shown in Fig. 4 the lock or anchor to prevent such turning is doubly secure.

It is to be understood that the core is cast about a mandrel which is removed after the metal has set and leaves a socket of the proper form and size to take the valve stem.

Preferably the core serves also as the binder to secure in place top and bottom plates $j$ and $k$ which lie against opposite faces of the handle body and cover the ends of the core. These plates are centrally cut so as to admit the valve stem and at the same time form prongs $l$ and $m$, respectively, which are embedded in the core and anchor the plates in place. These plates are applied to the opposite faces of the handle body before the metal is poured and completely cover the ends of the space in which the metal for the core is to be received.

The prongs $l$ and $m$ surround the shank or stem to which the completed handle is applied, and act as a bushing, thus providing bushings at both ends of the aperture in the handle. As the plates are preferably made of metal which is harder than that forming the core, for example, sheet iron, steel or brass, such bushings materially reinforce and add to the wear-resisting qualities of the socket in the core. A part of the present invention relates to a means for permitting the metal to be poured and permitting escape of air. It is preferred to pour the metal from that side of the body which is the bottom of the finished handle wherefore the handle is inverted from the position shown in the sectional views when the pouring operation takes place. Holes $n$ and $o$ are formed in the bottom plate $k$, either of which may be used as the pouring hole and the other may serve as a vent. In addition I provide a number of grooves $p$ of such slight width as to be little more than lines which are indented into that surface of the handle on which the edge of the plate $k$ rests and are carried beyond the inner and outer limits of such surface to make communication from the space wherein the flange $g$ of the core is molded to the outer air. These indentations are sufficiently numerous and are located at such intervals about the periphery of the aperture, as shown in Fig. 1, as to permit free escape of the air from the peripheral portion of the aperture whereby the metal is enabled readily to flow up to the extreme limits of the aperture and entirely fill the end enlargement thereof, forming the flange $g$ as a complete and solid flange. The same result occurs in the case of the flange $g'$ shown in Figs. 3 and 4.

The metal bottom plate $k$ has characteristics which also constitute a feature of the invention. First, as to the holes $n$ and $o$ in such plate. These holes are formed by die punching in such a way that three sides of the hole are cut out by the die, thus forming a tongue which is united integrally with the plate at one side of the hole. Such tongues are bent up far enough to leave the hole unobstructed for pouring and also to furnish prongs which are embedded in the metal core and assist the prongs $m$ in bonding the plate to the body of the handle. A second point in connection with the plate is that it is preferably given an ornamental finish, having a bright polished outer surface. I prefer to finish this surface by a plating of nickel, by which I secure the further advantage that the metal used for making the core will not stick to it. Sometimes in pouring the core the molten metal will spill over onto the plate, but the nickled surface of the plate prevents the spilled metal from adhering, so that, upon hardening the bits of metal may be knocked off. This is a feature of great practical importance as it saves much time in cleaning the plate of overflowed metal, and thereby enables the handle to be made economically and furnished to the trade at a low price. When the spilled metal adheres to the covering plate much time and labor is required to remove it. The bottom plate may also be used as a binder, and for that purpose may be provided with peripheral points or prongs *r*, shown in Fig. 6, which are formed as integral pointed extensions on the periphery of the disk and are bent up at right angles to the plane of the disk toward the same side as the prongs *m* and the tongues which are cut from the pouring holes *o* and *n*. These prongs *r* are driven into the handle body and assist in preventing rotation of the core, to which the plate is bonded, with respect to the body.

What I claim and desire to secure by Letters Patent is:—

1. A handle comprising a body having a recess, a core of metal cast in place in said recess and having a non-circular passage for the reception of a shank or the like, and a rod or wire mounted in said body to cross a part of said recess, the central part of such rod being embedded in the metal core, and its ends passing into the body at opposite sides of the core, whereby to prevent turning of the core within the body.

2. A handle comprising a body portion having a central aperture, a rod embedded at its ends in said body and crossing a portion of said aperture, that portion of the rod which crosses the aperture being laterally offset, and a metal core occupying the aperture and embedding the offset portion of the rod, whereby the rod is anchored in the core.

3. A valve handle comprising a body provided with an aperture, a plate extending across one end of said aperture and provided with an opening and prongs beside such opening extending into the aperture and a metal core in said aperture embedding said prongs and having a socket in alinement with the opening in the plate.

4. A handle comprising a body portion having a recess extending inwardly from one end and a metal core cast in place in said recess, the core being provided with a socket, and a plate covering one end of said core, having a hole in line with such socket and having an opening and a tongue struck from said opening and embedded in the core.

5. A handle comprising a body portion having a recess extending inwardly from one end and a metal core cast in place in said recess, the core being provided with a socket, and a plate covering one end of said core, having a hole in line with such socket and having an opening and a tongue struck from said opening and embedded in the core and the plate having also prongs at its periphery embedded in the body.

6. A handle comprising a body portion having a recess extending inwardly from one end and a metal core cast into place in said recess, the core being provided with a socket, and a plate covering one end of said core, having a hole in line with such socket and also having prongs at its periphery embedded in said body.

7. A handle comprising a body portion having a recess extending inwardly from one end and a metal core cast in place in said recess, the core being provided with a socket, and a plate covering one end of said core, having a hole in line with the socket and having also prongs at its periphery embedded in the body.

8. A valve handle comprising a body provided with a central aperture, a plate extending across one end of said aperture and provided with an opening, and prongs beside such opening extending into the aperture, said plate also having prongs at its periphery embedded in said body, and a metal core in said aperture embedding the first described prongs and having a socket in alinement with the opening in the plate.

9. A valve handle comprising a body having a recess opening inwardly from one face thereof, a rod embedded in said body crossing the end portion of said recess, a plate overlying the end of said recess having a hole and prongs extending into the recess from the edges of said hole, and a metal socket cast in place in said recess embedding that portion of the rod which crosses the recess and also embedding the prongs of the plate, thereby anchoring the plate and being itself secured from turning in the body by the rod, said core having a socket at one side of the rod and in alinement with the opening in the plate.

10. A handle comprising a body provided with a central aperture, a core occupying said aperture and having a socket to receive a stem or the like, a plate overlying one end of said aperture and bearing at its edge against the body, and said body having grooves passing under the edge of the plate and leading from the core to the outside of the handle.

11. A body for a valve handle comprising a disk having a central aperture with a flaring enlargement in one end, said disk having grooves extending from within said enlargement to points beyond the outer limit thereof.

12. A valve handle blank comprising a wooden disk having a central aperture enlarged at one end and containing rods set crosswise in the blank and passing through and entirely across the said enlargement.

13. A valve handle comprising a disk having a central aperture with outwardly flaring enlargements at both ends, a metal core cast in said aperture and having integral flanges occupying such enlargements and embracing the intermediate part of the body between them, and an anchoring rod passing through one of said enlargements and being embedded at its central part in the flange occupying the same, and extending into the body.

14. In a valve handle, a covering plate provided with a central hole and prongs struck up from the margin of said hole, said plate having a plurality of holes with a tongue projecting from the side of each of such holes.

15. A valve handle comprising a body, a socketed metal core cast in place within the central portion of said body, and a plate overlying the end of said core and having anchoring portions embedded therein and also having an opening alined with the socket of the core, the outer surface of the plate being of metal which is repellent to the metal of which the core is composed when in molten condition.

16. A valve handle comprising a body having a passage through it, a socketed metal core cast in place within said body, and metal plates lying across the ends of said core at opposite sides of the body, each having an opening in line with the socket of the core, and having tongues struck from said openings extending into said core.

17. A valve handle comprising a body having an opening, a metal core cast in place within said opening and having a socket, and a metal plate lying across the end of said core having an opening in line with said socket and tongues struck up from the margin of the hole embedded in the core and lining the entrance to the socket.

18. A valve handle comprising a body having a recess, a fusible metal core cast in place within said recess and having a socket to receive a stem or shank, the handle having cavities adjacent to said recess over and into which the core is flowed, forming lugs which prevent relative rotation between the body and core.

19. A reinforced valve handle consisting of a body portion having a central aperture or passage and a socketed metal core cast in place within said passage, and provided with outwardly extending flanges at its ends overlying adjacent surfaces of the body, arranged to prevent relative axial movement of the body and core.

20. A valve handle consisting of a circular body having a circular passage and a beveled surface entering such passage from its upper or outer face, and a fusible metal core having a socket to receive a valve stem cast in place in said passage and formed with a flange overlying said beveled surface.

In testimony whereof I have affixed my signature.

EDWIN C. HOLTON.